United States Patent [19]

Foster

[11] 3,989,266
[45] Nov. 2, 1976

[54] BOAT TRAILER
[76] Inventor: Paul L. Foster, P.O. Box 1463, Vero Beach, Fla. 32960
[22] Filed: Apr. 18, 1975
[21] Appl. No.: 569,486

[52] U.S. Cl. .............................. 280/414 R; 280/482; 214/505
[51] Int. Cl.² .......................................... B60P 3/10
[58] Field of Search ...................... 280/414 R, 482; 214/505; 294/84

[56] References Cited
UNITED STATES PATENTS

| | | | |
|---|---|---|---|
| 2,810,589 | 10/1957 | Tarleton | 280/414 R |
| 2,856,087 | 10/1956 | Steber | 280/414 R X |
| 2,938,642 | 5/1960 | Felix | 214/505 |
| 3,048,138 | 8/1962 | Ryan | 294/84 X |
| 3,127,041 | 3/1964 | Flynn et al. | 214/505 |
| 3,167,198 | 1/1965 | Echler et al. | 214/505 |
| 3,326,573 | 6/1967 | Neitzey | 280/414 R X |

Primary Examiner—M. H. Wood, Jr.
Assistant Examiner—R. Schrecengost
Attorney, Agent, or Firm—Richard L. Schwaab

[57] ABSTRACT

A boat trailer with a telescoping tongue for facilitating the launching of a boat is described. The trailer is towed in a retracted position and, for launching and mooring, the tongue is telescoped by a positive drive to an extended position, wherein detachment and further mooring of the boat with respect to the trailer can be effected remotely.

8 Claims, 9 Drawing Figures

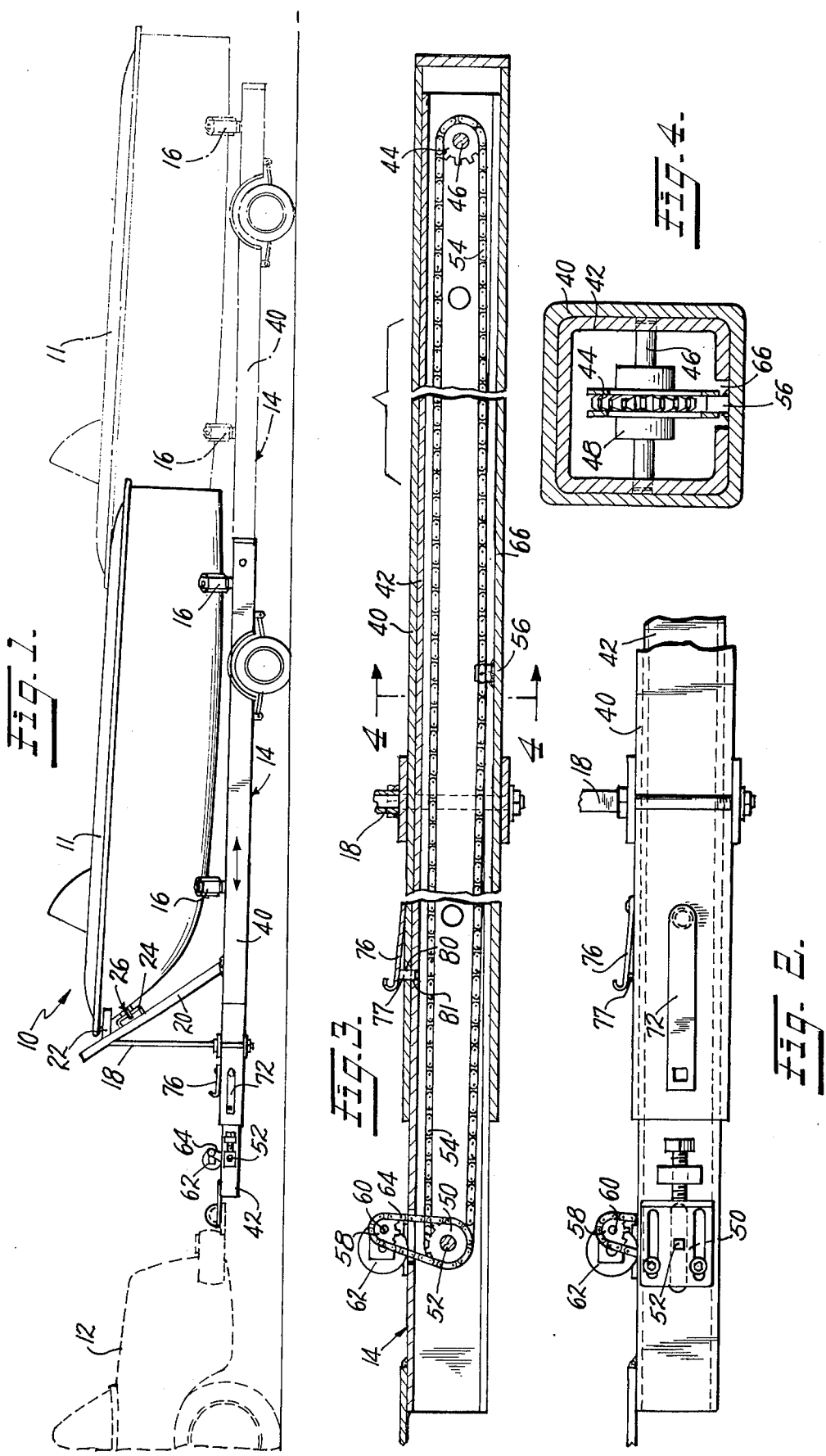

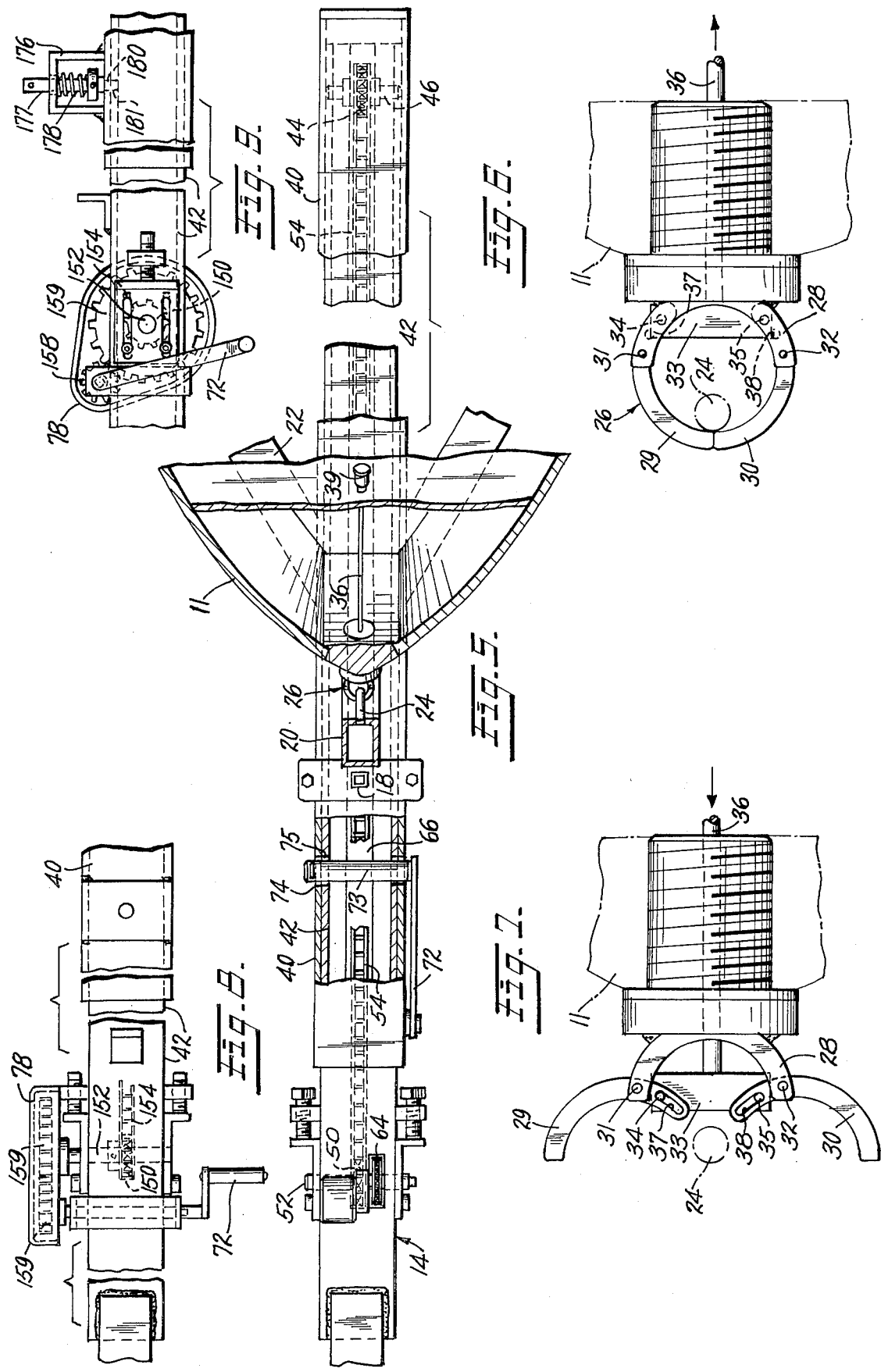

BOAT TRAILER

BACKGROUND OF THE INVENTION

1. Field of the Invention

The present invention relates to a watercraft trailer and, more particularly, to a boat trailer capable of extension to a length of approximately twice its towing length to facilitate launching of a boat. Both launching and mooring are capable from a position within the boat.

2. Description of the Prior Art

As the popularity of boating has increased and the availability of both pleasure craft and areas for their use have become widespread, many devices and apparatus have been developed to facilitate the transportation of the boat as well as the launching thereof. Such features are of prime consideration to many who enjoy this recreational activity but are, for example, elderly or physically infirmed and, thus, are oftentimes restricted from full enjoyment of this pasttime due to difficulties attendant transport and launching of a boat.

One attempt to promote the ease of launching or mooring a boat is described in U.S. Pat. No. 3,227,292 to Jacobs which describes a pivotal boat ramp located proximate the water's edge whereby a boat may be stored thereon and easily launched or moored by merely pivoting the entire ramp about a central hinge point. However, obviously, such a permanent installation is unsuitable for those who wish to use numerous, often remotely located recreational waters.

To provide for ease of mobility, U.S. Pat. No. 3,318,472 describes a trailer suitable for the transportation of small recreational craft. The trailer incorporates a drop frame which may be lowered or raised for receiving and transporting a boat. While such a design certainly provides the advantage of ease of transportation, other problems regarding launching of the boat are still presented.

U.S. Pat. No. 3,032,353 to Williams et al similarly describes a trailer for transporting a boat, which trailer is provided with a telescoping tow bar whereby the trailer may be extended from its normal, retracted towing position to aid the launching of the boat. The telescopic action is provided, basically, by the combination of gravity and the ability to controllably admit or discharge air within the telescopic members. While Williams et al indeed provide an easy means for launching the boat, no means are provided to retract the trailer to its typical towing configuration or to otherwise aid in mooring the boat or remove it from the water.

Various other techniques to aid or augment the handling of small pleasure craft are described in U.S. Pats. No. 3,083,986 to Moody et al. and No. 2,763,384 to Foster. Moddy et al illustrate the concept of providing a trailer whose various dimensions are adjustable to accommodate varying configurations of pleasure craft. Foster is primarily concerned with loading and unloading a boat on a trailer with a minimum amount of difficulty. The device of Foster involves a modification of the conventional winch system, whereby the front post of the trailer is rendered movable rather than merely a line extending therefrom.

While the prior art suggests various, alternate means to facilitate both the transportation and launching of small boats, none of the devices heretofore devised has efficiently and simply provided a trailer having the combined capability of being extended for launching the boat and then being easily retracted for towing the boat, coupled with the ability to both launch and moor the boat from a position within the boat cockpit. Accordingly, the need for such features exists, particularly for those physically incapable of handling a boat utilizing conventional trailer designs.

SUMMARY OF THE INVENTION

It is, therefore, the primary object of this invention to provide a trailer assembly to expedite both the launching and mooring of a boat.

It is another object of this invention to provide a telescoping trailer tongue with positive, auxiliary motive means capable of causing displacement of the telescoping members in both longitudinal directions.

It is yet another object of the invention to provide means located solely within the boat cockpit, and cooperating with the trailer, to aid in the launching and mooring of the boat.

In accomplishing the enumerated objects, the present invention provides a trailer comprising a tongue formed of two concentric members capable of telescopic displacement relative to one another by means of a manually or electrically operated winching mechanism, and a frame attached to the tongue for supporting the boat. Additionally, the trailer is provided with an upstanding attachment member fixed to the boat-supporting frame bearing an inwardly oriented "U-shaped" ring which cooperates with a split-ring located on the forwardmost edge of the boat. Means located within the boat cockpit are provided to selectively open or close the split ring about the U-shaped member to disengage or engage the boat therefrom.

Other objects, features and advantages of the present invention will become apparent from the following detailed description of preferred embodiments, when considered together with the attached figures of drawing.

BRIEF DESCRIPTION OF THE DRAWINGS

FIG. 1 is a side elevational view of the extensible boat trailer of the present invention, the extended position being shown in phantom lines;

FIG. 2 is an enlarged fragmentary side elevational view of the forward portion of the boat trailer of FIG. 1;

FIG. 3 is a longitudinal sectional view through the boat trailer, showing the driving mechanism for extending and retracting the trailer tongue;

FIG. 4 is a an enlarged transverse sectional view, taken along line 4—4 of FIG. 3;

FIG. 5 is a top view, partly in section, of the forward portion of the trailer and boat illustrated in FIG. 1;

FIG. 6 is an enlarged plan view of the latching mechanism for securing the boat to the trailer, shown in its closed position;

FIG. 7 is a view, similar to FIG. 6, but showing the latch in its open position.

FIG. 8 is a fragmentary plan view of a modification of the actuating mechanism of the telescoping boat trailer; and FIG. 9 is a fragmentary side elevation of the modification of FIG. 8.

DETAILED DESCRIPTION OF THE PREFERRED EMBODIMENT

In order to more fully describe the objects and advantages of the present invention, the following detailed description of the preferred embodiment is presented the same being intended as illustrative and in no wise limitative.

Referring to the drawings, FIG. 1 shows the trailer of the present invention designated generally by the reference numeral 10 and carrying a boat 11. The trailer is designed to be drawn behind a car 12 or other vehicle, as is conventional. In phantom lines, the trailer is shown in its fully extended position.

The trailer 10 is comprised of a central frame 14 from which extend laterally a plurality of cradle or support members 16 designed to receive boat 11. Also depending from central frame 14 are upstanding attaching members 18 and 20 for providing added stability to the boat during transportation thereof as well as a convenient means for securely attaching the boat to the trailer. In furtherance of this stability and attachment, a V-shaped member 22 is provided to engage the bow of boat 11, while a U-shaped bar 24 is provided on member 20 for cooperation with a split ring 26 carried on the forwardmost edge of the bow of boat 11, the operation of which will be described more fully hereinbelow.

As best viewed in FIGS. 3 and 4, the central frame 14 is comprised of an outer tongue member 40 and an inner tongue member 42 arranged concentrically and being capable of telescopic displacement relative to one another in both longitudinal directions. Disposed interiorly of the tongue member 42 is a first sprocket 44 carried on a shaft 46 which is journaled within inner tongue member 42. Bearings 48 are provided for free and easy rotation of the sprocket. A second sprocket 50 carried on a shaft 52 is similarly journaled within inner tongue member 42. A chain 54 is disposed about sprockets 44 and 50 in operative engagement with the teeth of each sprocket. Chain 54 is securely fastened to outer tongue member 40 by means of a pin 56 which may be welded or bolted thereto.

A third sprocket 58 is disposed exteriorly of frame 14 and is borne on a shaft 60 in operative engagement with an electric motor 62. Motor 62 may be driven by, for example, the battery of car 12 or any other suitable auxiliary power source. Optionally, motor 62 may be replaced with a hand-operated winch, as will be described more fully hereinbelow. Regardless, however, of the source of operative power, a chain 64 is provided in cooperating engagement with sprockets 50 and 58. When shaft 60 is driven by electric motor 62, the rotational movement is imparted to sprocket 50 by means of chain 64. This rotational movement is translated to chain 54 about sprockets 44 and 50. By virtue of the fact that chain 54 is securely affixed to outer tongue member 40, longitudinal movement thereof with respect to inner tongue member 42 is achieved. A slot 66, formed in inner tongue member 42, allows independent telescopic action of outer and inner tongue members, 40 and 42, as chain 64 rotates about sprockets 44 and 50. Slot 66 is necessary for clearance of pin 56 as the two tongue members are relatively displaced. Obviously, the sprocket/chain system described could be adequately replaced by a pulley/belt system should such be desirable.

To expedite both the launching and mooring of boat 11, U-shaped bar 24, attached to upstanding post 20, is provided in cooperation with split ring 26 which is securely attached to the forwardmost edge of the boat bow. Split ring 26, as best viewed in FIGS. 6 and 7, is composed of a central, stationary arcuate member 28 and two arcuate members 29 and 30 pivotally secured thereto about pins 31 and 32, respectively. A bar 33 joins arcuate portions 29 and 30 at pins 34 and 35, respectively. A pushrod 36 is connected to bar 33 to provide lateral motion thereto, whereby arcuate members 29 and 30 pivot about pins 31 and 32 causing relative motion therebetween as pins 34 and 35 travel within the slots 37 and 38, respectively. A knob 39 located within the cockpit of boat 11 is provided to actuate bar 33 and thus effect opening and closing of split ring 26.

In operation, boat 11 is transported to the launching site on trailer 10 when the trailer is in its fully retracted position as shown in FIG. 1. The trailer is then positioned at the water's edge, or partially in the water, and motor 62 is energized to telescopically displace outer tongue member 40 relative to inner tongue member 42, whereby the trailer assumes the extended position shown in phantom lines in FIG. 1. Conventional remote control activating means can optionally be provided to energize motor 62. At this time, the trailer will follow the downward topography of the bottom of the body of water while the boat will float upon the water's surface, vertically displaced from the trailer support members 16 and securely attached to upstanding post member 20 by virtue of U-shaped bar 24 in cooperation with split ring 26. One may then enter the boat, or if already in the boat, may simply manipulate knob 39 to cause the closed split ring 26 to open to a position as shown in FIG. 7, whereby the boat is launched. When it is desired to moor the boat, one need merely drive the boat into engagement with V-shaped support member 22 (of the trailer in its extended position described above) and actuate know 39 whereby split ring 26 is caused to close about U-shaped bar 24 into the configuration as shown in FIG. 6. Then, motor 62 may be energized to retract the trailer into its normal towing position which simultaneously causes boat 11 to settle within cradle members 16.

As noted hereinabove, the motor 62 may be replaced by a hand-operated winch. This modification is illustrated in FIGS. 8 and 9. When the motor is replaced by a hand-operated mechanism, it is desirable to employ a gear-reduction feature to aid in extending and retracting the trailer. Of course, the gear reduction may also be provided when an electric motor is employed to thereby reduce the size and power requirements thereof.

Referring specifically to FIGS. 8 and 9, there is shown a gear-reduction mechanism designated generally as 78. The gear reduction is achieved, as is convention, by rotating a relatively small diameter gear 158 whose teeth engage a proportionately larger diameter gear 159. Gear 159 is journaled on a shaft 152 in common with a drive sprocket 150 which corresponds in function to the drive sprocket 50 described above. As the drive gear 158 is rotated by, for example, lever 72, the force is translated to sprocket 150 which subsequently drives chain 154 in a manner identical to that described above, to effect translational motion between inner and outer tongue members 40 and 42. When the gear reduction mechanism 78 is incorporated in addition to electric motor 62, it is then possible to operate the extension and retraction of the trailer tongue either manually or electrically. Thus, in the event of either a failure of the electric motor or lack of operative power thereto, a trailer may be extended and retracted manually nonetheless.

As a measure of added safety in transportation and storage, there is provided a locking pin 76 which is capable of securing the outer and inner tongue members 40 and 42 in the fully retracted position. As depicted in FIGS. 1 and 3, the locking pin is biased inwardly, i.e., toward the tongue members, with a protruding member 77 adapted for insertion through apertures 80 and 81 located in outer and inner tongue members 40 and 42, respectively. The apertures 80 and 81 are located in registration when the trailer is in its fully retracted position. When it is desired to extend the trailer, the operator need merely urge member 76 upwardly, away from the apertures against the biasing force and provide power to the drive mechanism. Upon retraction of the tongue members, apertures 80 and 81 will come in to registry and the biasing force will cause pin 76 to be positively displaced into engagement with the apertures and hold the tongue members securely in that position.

FIG. 9 illustrates a modification of this safety pin wherein a pin 177 is biased toward the tongue members by spring 178, Apertures 180 and 181 function identically with the apertures 80 and 81 of FIG. 3.

As a further measure of safety, as well as convenience, the lever 72 employed to actuate the extension and retraction of the trailer may be conveniently stored within the tongue members. To this end, there are provided another pair of cooperating apertures 74 and 75, and best viewed in FIG. 5. During transportation, lever 72 is removed from the drive shaft and reattached in reverse orientation, with cross piece 73 inserted through apertures 74 and 75.

While the invention has been described and illustrated with reference to a preferred embodiment thereof, those skilled in the art will appreciate that various modifications, changes, omissions and substitutions may be made without departing from the spirit of the invention. It is intended, therefore, that the invention be limited only by the scope of the following claims.

What is claimed is:
1. A trailer adapted for towing behind a land vehicle for transporting a boat, and further adapted for the launching and mooring of said boat, comprising:
   a. first and second longitudinally concentric members defining a tongue for securely attaching said trailer to said vehicle;
   b. a frame depending from said tongue for supporting said boat;
   c. means for positive telescopic displacement of said concentric members relative to one another in both longitudinal directions;
   d. a substantially vertical member extending upwardly from the forward portion of said frame;
   e. aperture means arranged on said vertical member in a position contiguous to the bow of said boat when in a trailered position;
   f. means attached to said boat for selectively engaging said aperture means in grasping relationship, comprised of a ring member having at least two sections capable of being displaced with respect to one another to selectively open and close said ring; and,
   g. means positioned in said boat for activating said selective engaging means comprising a positive displacement member connected to said ring sections.

2. The trailer as defined in claim 1, wherein said displacing means comprises:
   a. first and second sprockets supported by said first concentric member;
   b. an endless chain disposed in cooperative relationship with said first and second sprockets;
   c. means connecting said chain to said second concentric member; and
   d. motive means to impart rotational motion to one of said sprockets.

3. The trailer as defined in claim 2, wherein said motive means is an electric motor.

4. The trailer as defined in claim 1, further comprising apertures in each of said first and second concentric members, said apertures being in registration when said tongue is in its fully retracted position said apertures being adapted for receiving a pin therethrough whereby accidental displacement of said concentric members is precluded.

5. The trailer as defined in claim 4, further comprising a pin member attached thereto and being adapted for biasing into said apertures in said first and second concentric members when said tongue is in its fully retracted position.

6. The trailer as defined in claim 2, wherein said sprockets are journaled within said first concentric member.

7. The trailer as defined in claim 2, further comprising gear reduction means operatively associated with said motive means and positioned intermediate said motive means and one of said sprockets.

8. A trailer adapted for towing behind a land vehicle for transporting a boat and adapted for the launching and mooring of said boat, comprising:
   a. first and second longitudinally concentric members defining a tongue for securely attaching said trailer to said vehicle;
   b. a framt depending from said tongue for supporting said boat;
   c. means for positive, telescopic displacement of said concentric members relative to one another in both longitudinal directions whereby said trailer is capable of extension up to approximately twice its unextended length, said displacement means comprising:
      1. first and second sprockets supported by said first concentric member;
      2. an endless chain disposed in cooperative relationship with said first and second sprockets;
      3. means connecting said chain to said second concentric member; and
      4. motive means to impart rotational motion to one of said sprockets, wherein said motive means is a hand-operated winch operatively communicating with one of said sprockets through gear reduction means, and further comprising;
   a. apertures in each of said first and second concentric members, said apertures being in registration when said tongue is in its fully retracted position; and,
   b. a handle member for operating said winch, said handle member oriented transversely with respect to said trailer and being adapted for selective insertion into said apertures in said first and second concentric members.

* * * * *